A. H. GLEASON.
FRICTION CLUTCH.
APPLICATION FILED JAN. 5, 1914.
1,117,182.
Patented Nov. 17, 1914.
2 SHEETS—SHEET 1.
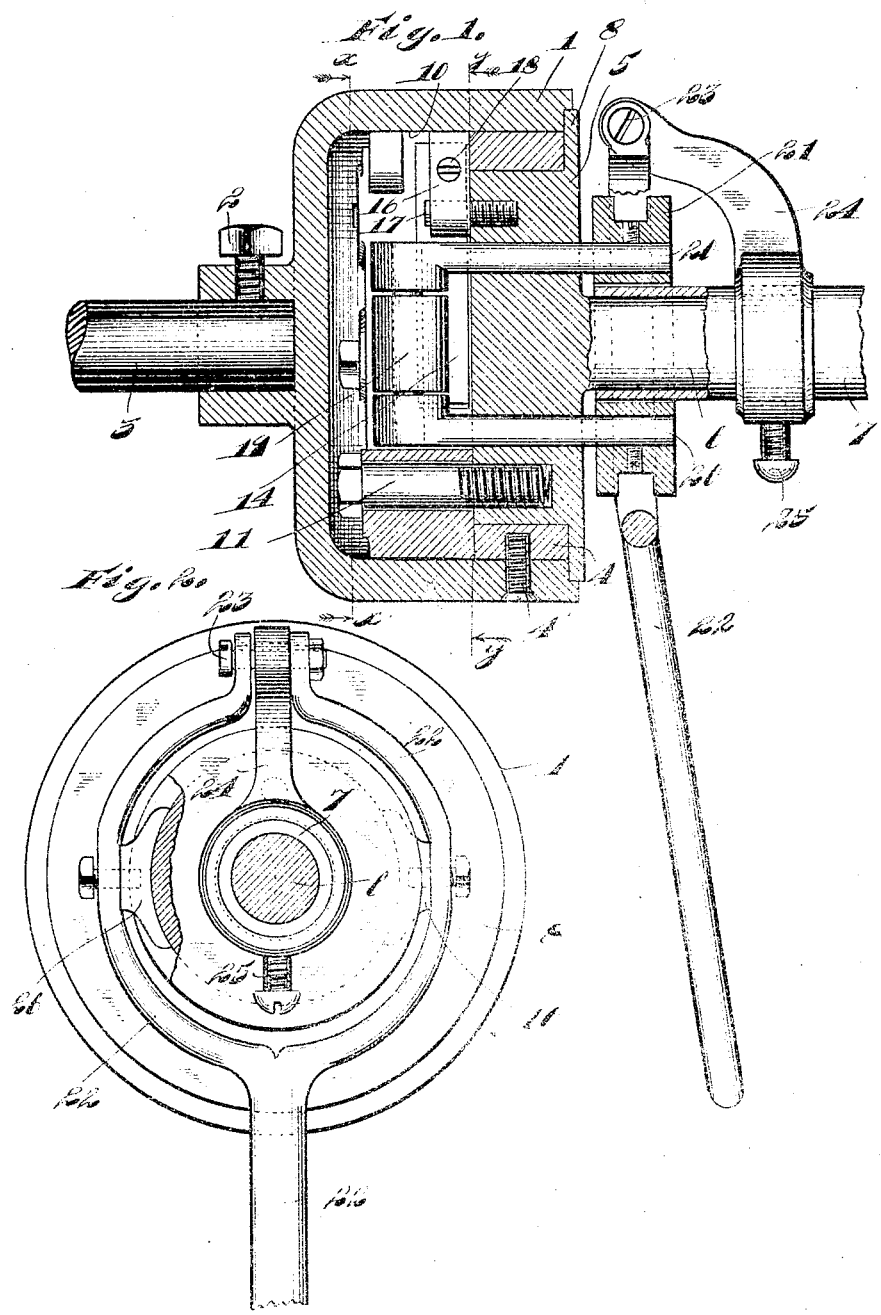
Witnesses:
E. E. Beasels.
A. A. Olson.
Albert H. Gleason,
By Joshua R. H. Potts
his Attorney.

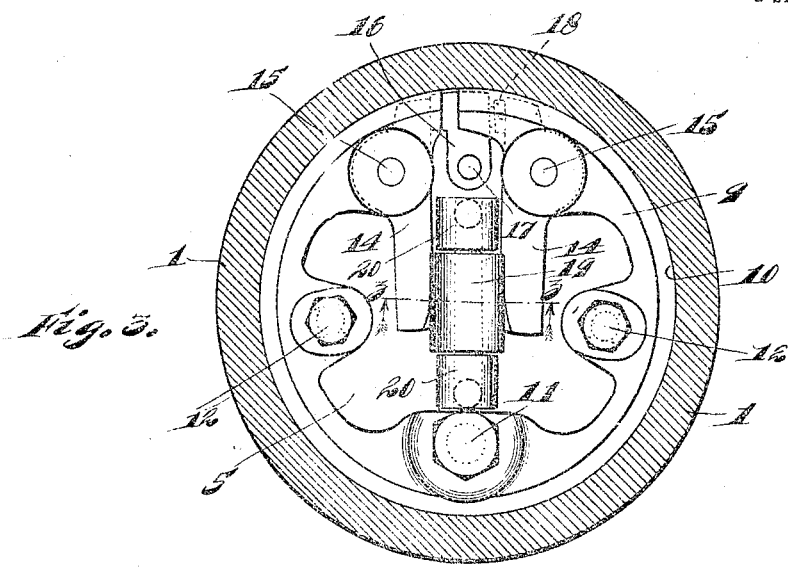

UNITED STATES PATENT OFFICE.

ALBERT H. GLEASON, OF KENOSHA, WISCONSIN.

FRICTION-CLUTCH.

1,117,182.   Specification of Letters Patent.   Patented Nov. 17, 1914.

Application filed January 5, 1914.   Serial No. 810,386.

*To all whom it may concern:*

Be it known that I, ALBERT H. GLEASON, a citizen of the United States, and a resident of the city of Kenosha, county of Kenosha, and State of Wisconsin, have invented certain new and useful Improvements in Friction-Clutches, of which the following is a specification.

My invention relates to improvements in friction clutches and has for its object the production of a clutch of this character which will be of durable and economical construction and efficient in use.

Other objects will appear hereinafter.

The invention consists in the combinations and arrangements of parts hereinafter described and claimed.

The invention will be best understood by reference to the accompanying drawings forming a part of this specification, and in which;

Figure 1 is a substantially central longitudinal section of a friction clutch embodying my invention, Fig. 2 is a sectional end view thereof, Figs. 3 and 4 are transverse sections taken on substantially lines $x$—$x$ and $y$—$y$ respectively of Fig. 1, and Fig. 5 is a fragmentary detail section taken on substantially line $z$—$z$ of Fig. 3.

The preferred form of construction as illustrated in the drawings comprises a hollow circular member 1 which, when in use, is secured by a set-screw 2 to the driving or power shaft 3. Arranged within the member 1 adjacent the open end thereof is a collar 4 secured in position by means of screws 4'. Loosely mounted in the collar 4 is a cylindrical member 5 which, when in use, is connected with the driven shaft 6, the latter being shown in a stationary casing or housing 7. Provided at the periphery of the member 5 is an annular flange 8 which engages against the corresponding end of the collar 4 so as to hold said parts against relative longitudinal movement in one direction.

Arranged within the member 1 upon the inner side of the member 5 is a split expansion band 9 adapted, when expanded, to frictionally engage with a circular friction surface 10 constituted at the inner side of member 1 in order to operatively connect the members 1 and 5 and hence the shafts 3 and 6. The expansion band 9 is secured to the member 5 by means of a bolt 11 which passes through said band midway the ends thereof, bolts 12 passing through the portions of said band, midway the bolt 11 and the extremities of said band, the bolts 12, however, engaging with elongated slots 13 provided in said band which affords clearance for said bolts in order to permit of flexing of the ends of said band in the expansion and contraction thereof, as will be readily understood. The bolts 12 serve to relieve the burden of bolts 11 in the connection of the band 9 with the member 5, it being clear that without the employment of bolts 12, in operation, a tremendous strain would be placed upon the single bolt 11 when the expansion band was expanded to connect the shafts 3 and 7. When the shafts 3 and 7 are connected through the expansion of band 9, the strain upon the latter is longitudinally thereof so that the elongation of the slots 13 transversely of the band permits of free flexing of the ends of the band without interfering with the bolts 12 performing their function of connecting the band with the member 5. Said band 9 is of a diameter greater than that of the member 5, being just slightly less than the internal diameter of member 1, and so that said band engages against the inner end of collar 4 so as to serve in conjunction with the flange 8 to hold the parts 1 and 5 against relative longitudinal movement.

Outward flexing of the ends of the band 9 in order to effect expansion of the latter is secured through the medium of levers 14 which are fulcrumed intermediate their ends at 15 to the terminals of said band. The outer ends of said levers engage with a fulcrum member 16 which is pivotally secured at 17 to member 5, the arrangement being such that, when the inner ends of said levers are rocked outwardly, the outer ends thereof will engage against the member 16 which will serve as a fulcrum therefor and thereby effect outward flexing of the ends of band 9. The fulcrum member 16 is provided at one side with a screw 18 for engagement with one of said levers 14, said screw being provided in order to permit of adjustment so as to compensate for wear and maintain the relative position of levers 14. Coöperating with the inner ends of levers 14 is a roller 19 mounted in bearings provided in the inner ends of pins 20 which are slidably mounted in the member 5, the outer ends of said pins being fixed in a shifting collar 21 which is loosely mounted so as to rotate in unison with member 5 and shaft 6. The roller 19 is adapted normally to remain out of registration with the inner ends of levers 14. Said roller is of such a diameter that, when moved into registration with said lever ends, the latter will be spread apart causing outward flexing of the ends of the band 9 connected therewith. The movement of roller 19 into and out of registration with levers 14 is effected by means of a split fork or lever 22 which coöperates with shifting collar 21, said fork being fulcrumed at 23 to a bracket 24 which is fixed by means of set-screw 25 to the shaft casing 7, blocks 26 provided at the opposite sides of fork 22 loosely engaging the channel of collar 21 at opposite sides thereof. With this arrangement then, it will be seen that when the lever 22 is at its left hand terminal of oscillation, the roller 19 will be out of registration with levers 14, in which event the band 9 will be in contracted condition and hence the parts 1 and 5 permitted to run free and independent of each other. When it is desired to operatively connect said parts, it is only required to rock the fork 22 to the right, this movement causing the roller 19 to be forced to position between the inner ends of lever 14, spreading the latter and hence effecting outward flexing of the ends of band 9 into frictional engagement with the friction surface 10. The construction is such that a chamber is formed at the inner end of the clutch member 1 for the accommodation of a lubricant for effecting lubrication of the various parts of the mechanism. This chamber which is completely inclosed contains all of the delicate parts of the clutch serving to protect the same and preventing the entrance of dust or foreign matter to interfere with the proper operation thereof.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A friction clutch comprising a rotary cylindrical element; a rotary circular member loosely mounted upon said cylindrical element, said circular member having an internal circular friction surface; a split expansion band mounted upon said cylindrical element, and adapted, when expanded, to frictionally engage said friction surface; a pair of oscillatory levers also mounted upon said cylindrical element for coöperation with the ends of said band; a wedge member; guide studs slidably mounted in said cylindrical element for supporting said wedge member; and means engaging with said studs to move said wedge member into and out of registration with said levers for rocking the latter to expand said band, substantially as described.

2. A friction clutch comprising a rotary cylindrical element; a rotary circular member loosely mounted upon said cylindrical element, said circular member having an internal circular friction surface; a split expansion band mounted upon said cylindrical element and adapted, when expanded, to frictionally engage said friction surface; a pair of oscillatory levers also mounted upon said cylindrical element for coöperation with the ends of said band; a roller adapted to be moved into and out of registration with corresponding ends of said levers for rocking the latter to expand said band; a pair of guide pins for supporting said roller, said guide pins being slidably mounted in said cylindrical element; and means engaging with said pins for manually adjusting said roller, substantially as described.

3. A friction clutch comprising a rotary cylindrical element; a rotary circular member loosely mounted upon said cylindrical element, said circular member having an internal friction surface; a split expansion band mounted upon said cylindrical element and adapted, when expanded, to frictionally engage said friction surface; a pair of oscillatory levers pivotally connected intermediate their ends with the terminals of said band; a loosely mounted fulcrum member with opposite sides of which corresponding ends of said levers are adapted to contact so that, when the opposite ends of said levers are spread said band will be expanded; a screw adjustably mounted in one side of said fulcrum member for contact with one of said levers; and means adapted to be moved into and out of registration with said levers to spread the same, substantially as described.

4. A friction clutch comprising a rotary cylindrical element; a rotary circular member loosely mounted upon said cylindrical element, said circular member having an internal circular friction surface; a split expansion band mounted upon said cylindrical element and adapted, when expanded, to frictionally engage said friction surface, there being a securing bolt passing through said band substantially midway its ends, and a pair of bolts passing through the portions of said band between said first mentioned bolt and the ends of said band, said last mentioned bolts engaging elongated slots provided in said band to permit of flexing of the ends thereof; and means for outwardly flexing said ends to expand said band, substantially as described.

5. A friction clutch comprising a rotary hollow circular member open at one end; a rotary cylindrical member loosely mounted in said first mentioned member and closing said end thereof so as to form an inclosed chamber within said member at the opposite end of the latter; an annular collar secured within said circular member; a shoulder on said cylindrical member engaging against one side of said collar to lock said parts against relative longitudinal movement in one direction, said circular member having an internal circular friction surface; a split expansion band mounted upon said cylindrical member within said chamber and adapted, when expanded, to frictionally engage said friction surface, said expansion band contacting with the other side of said collar to lock said parts against relative longitudinal movement in the opposite direction; and externally operable means for expanding said band, substantially as described.

6. A friction clutch comprising a rotary hollow circular member; a rotary cylindrical member loosely mounted in said first mentioned member; an annular collar within said circular member; a shoulder on said cylindrical member engaging one side of said collar to lock said parts against relative longitudinal movement in one direction, said circular member having an internal circular friction surface; a split expansion band mounted upon said cylindrical member adapted, when expanded, to frictionally engage said friction surface, said expansion band contacting with the other side of said collar to lock said parts against relative longitudinal movement in the opposite direction; and means for expanding said band, substantially as described.

7. A friction clutch comprising a rotary cylindrical element; a rotary circular member loosely mounted upon said cylindrical element, said circular member having an internal circular friction surface; a split expansion band mounted upon said cylindrical element and adapted, when expanded, to frictionally engage said friction surface; a securing device passing through said band substantially midway its ends; a pair of securing devices passing through the portions of said band, between said first mentioned securing device and the ends of said band, said last mentioned securing devices engaging elongated slots provided in said band to permit of flexing of the ends thereof; and means for outwardly flexing said ends to expand said band, substantially as described.

In testimony whereof I have signed my name to this specification in the presence of two subscribing witnesses.

ALBERT H. GLEASON.

Witnesses:
F. M. O'CONNOR,
W. M. BURKE.